US005562785A

United States Patent [19]
Yamanaka

[11] Patent Number: 5,562,785
[45] Date of Patent: Oct. 8, 1996

[54] METHOD FOR MANUFACTURING TOOTHED GEARS

[75] Inventor: Shigeaki Yamanaka, Hiroshima-ken, Japan

[73] Assignee: Kubota Iron Works Co., Ltd., Hiroshima, Japan

[21] Appl. No.: 423,753

[22] Filed: Apr. 18, 1995

[30] Foreign Application Priority Data

Apr. 22, 1994 [JP] Japan .................................. 6-084775

[51] Int. Cl.$^6$ ..................................................... C21D 9/22
[52] U.S. Cl. ........................ 148/573; 148/586; 29/893.32; 29/893.3
[58] Field of Search ................................ 29/893.3, 893.32, 29/893.33, 893.34, 893.35; 72/69; 148/573, 586

[56] References Cited

U.S. PATENT DOCUMENTS

| 438,406 | 10/1990 | Dewey | 72/69 |
|---|---|---|---|
| 659,723 | 10/1990 | Williams . | |
| 2,654,944 | 10/1953 | Wilson . | |
| 3,273,366 | 9/1966 | Schuman | 72/69 |
| 3,815,395 | 6/1974 | Sass | 72/69 |
| 5,068,964 | 12/1991 | Yabuno et al. . | |
| 5,237,745 | 8/1993 | Yamanaka . | |
| 5,310,432 | 5/1994 | Fukui . | |
| 5,396,787 | 3/1995 | Kanemitsu et al. | 29/893.32 |

FOREIGN PATENT DOCUMENTS

| 2282303 | 3/1976 | France . |
|---|---|---|
| 2524354 | 10/1983 | France . |
| 3715392 | 3/1988 | Germany . |
| 3819957 | 3/1989 | Germany . |
| 54-20190 | 7/1979 | Japan . |
| 54-44259 | 12/1979 | Japan . |
| 58-342 | 1/1983 | Japan . |
| 61-129241 | 6/1986 | Japan . |
| 1-161252 | 11/1989 | Japan . |
| 4-279239 | 10/1992 | Japan . |
| 6-63670 | 3/1994 | Japan . |
| 6-323399 | 11/1994 | Japan . |
| 2045665 | 11/1980 | United Kingdom . |

*Primary Examiner*—P. W. Echols
*Attorney, Agent, or Firm*—Armstrong, Westerman, Hattori, McLeland & Naughton

[57] ABSTRACT

A disc-shaped material is prepared by punching a high carbon steel plate or soft steel plate, and the disc-shaped material is fixed in position. An outer peripheral portion of the disc-shaped material is heated to a temperature of 400°–500° C. y means of a high frequency heater. The outer peripheral portion of the disc-shaped material is swaged to form a thickened portion by a swaging die and the thickened portion is then spun to plastically form a toothed gear to the outer peripheral portion of the disc-shaped material in two steps of coarse working and finish working by spinning dies. The thus formed toothed gear is further heated as occasion demands to a temperature of about 900° C. for quenching.

7 Claims, 10 Drawing Sheets

FIG. 10
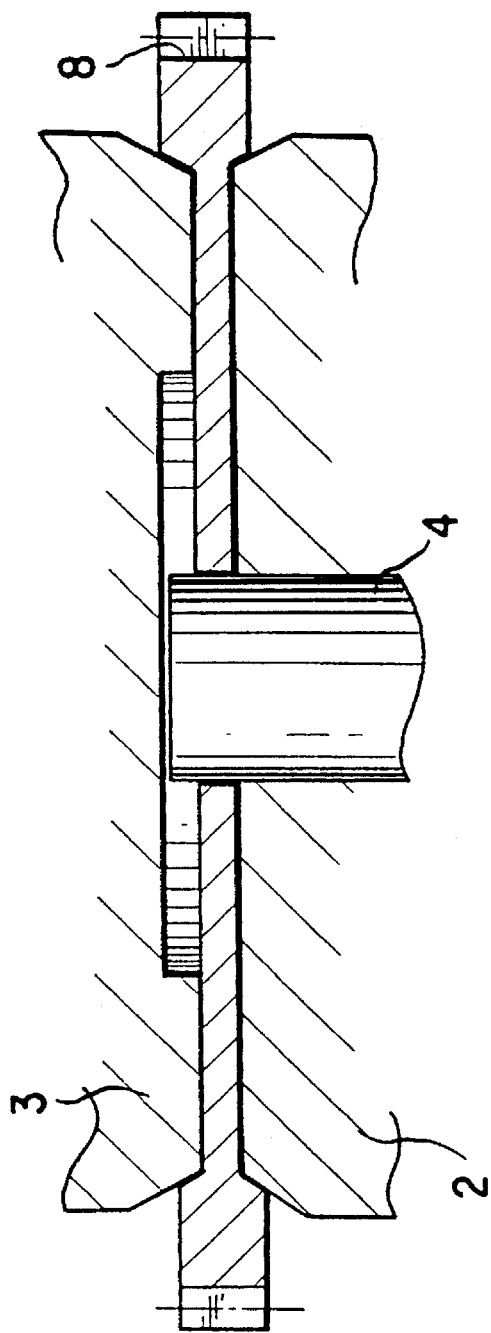
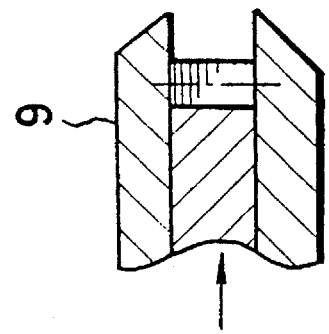

METHOD FOR MANUFACTURING TOOTHED GEARS

BACKGROUND OF THE INVENTION

The present invention relates to a method and apparatus for manufacturing a toothed gear from a disc-shaped material.

The inventor of the present application has heretofore proposed a method of manufacturing a dry plate as disclosed in the Japanese Patent Laid-open Publication No. HEI 4-279239.

The dry plate manufacturing method disclosed in such prior art publication is characterized in that an outer peripheral portion of a disc-shaped material is swaged in its axial direction by means of a swaging die to make the outer peripheral portion thereof thick. An inner side portion of the thus swaged portion is then pressed in the axial direction to form a dish-shaped blank. A support die is the press fitted to one of an outer peripheral portion and an inner peripheral portion and a toothed die is press fitted to the other one thereof so as to form toothed gear an either the outer or inner peripheral portions of the blank. Gear teeth are then formed on either one of these portions by rolling working or machining working.

As the disc-shaped material used for the dry plate manufacturing method in the above prior art, a high carbon steel plate is generally used. A soft steel plate may be used in a case where relatively high strength is not required and necessary strength can be obtainable by a hardening process through swaging working.

In the prior art swaging is performed at room temperature and a crack may be caused in the material by such working. Thus the lifetime of a tool is shortened.

In order to prevent such cracking, there is proposed a method, as disclosed in Japanese Patent Laid-open Publication No. HEI 6-323399, in which a spheroidizing process is required. However, such spheroidizing process involves manufacturing cost increasing, and the material to be used has a limit in its working condition. In addition, much labor is required for plastic deformation due to pressure application, requiring increased working processes and working times, thus providing problems.

SUMMARY OF THE INVENTION

An object of the present invention is to substantially eliminate defects or drawbacks encountered in the prior art described above and to provide a method and apparatus for manufacturing a toothed gear capable of preventing cracks or scales of a material, from which a toothed gear is manufactured, from causing during swaging and/or spinning working, during making of compact swaging and spinning units, and elongating usable life of tools and dies, thereby shortening the working processes and shortening working time and improving improvement productivity of the toothed gear.

This and other objects can be achieved, according to the present invention, by providing, in one aspect, a method of manufacturing a toothed gear comprising the steps of:

preparing a disk-shaped material to be worked;

fixing the disc-shaped material;

heating an outer peripheral portion of the fixed disc-shaped material to a temperature of 400°–500° C.;

swaging the outer peripheral portion of the disc-shaped material to form a thickened portion; and spinning the thickened portion to plastically form a toothed gear to the outer peripheral portion of the disc-shaped material.

The method may further include the step of heating the toothed gear to a temperature of about 900° C., for quenching, and then quenching the toothed gear.

In preferred embodiments, the spinning step includes a first step for forming a coarse toothed gear and a second step for forming a finished toothed gear.

The disc-shaped material is formed by punching from a high carbon steel plate. Then the quenching step is not required, a soft steal plate may be also utilized.

In another aspect of the present invention, there is provided an apparatus for manufacturing a toothed gear from a disc-shaped material, comprising:

a material support member for supporting the disc-shaped material;

a heating unit disposed around the material support member, the heating unit being supported by a support means capable of contacting and separating from the material support member;

a coarse working unit disposed around the material support member, the coarse working unit being supported by a support means capable of contacting and separating from the material support member, the support means for the coarse working unit comprising a plurality of supporting members capable of being selectively opposite to one another with respect to the material support member;

a finish working unit disposed around the material support member, the finish working unit being supported by a support means capable of contacting and separating from the material support member;

a swaging die mounted to the coarse working unit for swaging the disc-shaped material to provide a thickened portion to an outer peripheral portion thereof:

a first spinning die mounted to the coarse working unit for coarsely forming a toothed gear to the thickened outer peripheral portion of the material; and a second spinning die mounted to the finish working unit for finishing the toothed gear.

The first and second dies each comprises a tooth portion forming member and a pair of flange members clamping the tooth portion forming member at both axial side ends thereof, each of the flange portion having a diameter larger than that of the tooth portion forming member.

The heating unit is a high frequency heater for heating the disc-shaped material to a temperature of 400°–500° C., before the swaging and spinning processes, and to a quenching temperature of about 900° C. after the swaging and spinning processes.

According to the present invention of the characters described above, the disc-shaped material, supported by the support member is worked in a manner such that the outer peripheral portion of the material is heated and thickened through the swaging working. The thus thickened portion is then spun by the coarse spinning die and the finish spinning die to plastically form the toothed gear from the disc-shaped material. The quench hardening process, by means of high frequency heating, is adapted to the thus formed toothed gear portion, as occasion demands.

The formation of the toothed gear, by means of the coarse spinning and finish spinning dies, is carried out partially in a closed forging manner.

The nature and further features of the present invention will be made more clear through the following description by way of preferred embodiments with reference to the accompanying drawings.

BRIEF DESCRIPTION OF THE DRAWINGS

In the accompanying drawings:

FIG. 10 is a sectional view, similar to that of FIG. 9, in a state for the outer peripheral portion of the material being spun for finish working.

DESCRIPTION OF THE PREFERRED EMBODIMENTS

An apparatus for manufacturing toothed gears of one embodiment of the present invention will be described hereunder with reference to FIGS. 1 to 5.

Figure 1:
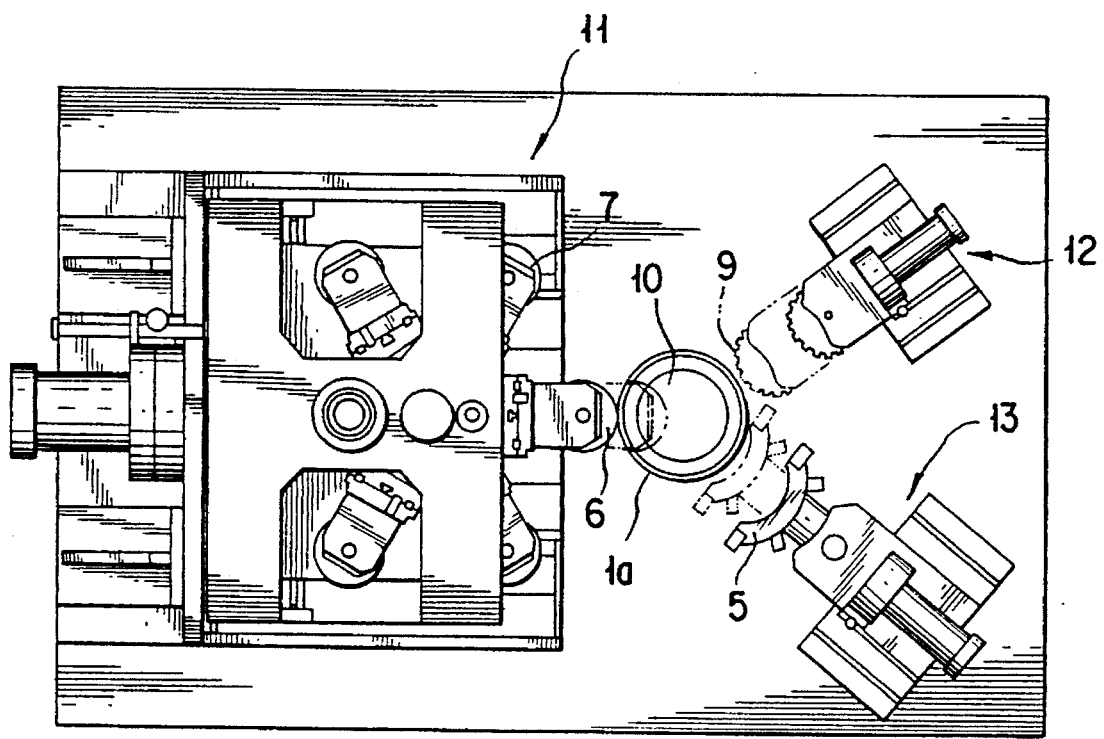
FIG. 1 is a plan view of a toothed gear manufacturing apparatus according to the present invention.
Figure 2:
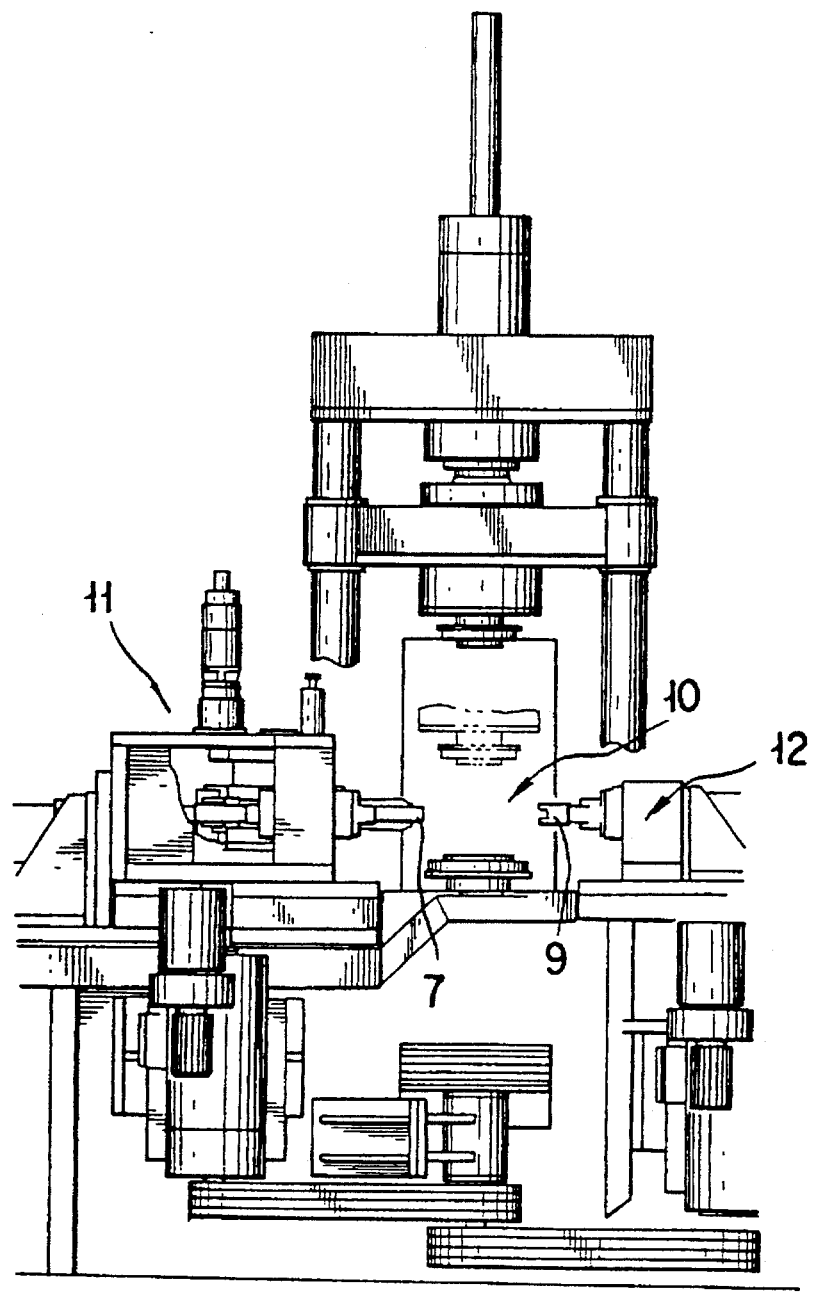
FIG. 2 is a front view of the apparatus shown in FIG. 1.

Referring to FIGS. 1 and 2, showing plan and front views of the toothed gear manufacturing apparatus of the present invention, reference numeral 10 denotes a material support member, and a coarse working unit 11 (or preforming unit), a finish working unit 12 and a high frequency heating unit 13 all arranged around material support member 10. The coarse working unit 11 includes a plurality of stations, disposed successively in turret form, so as to oppose to the material support member 10. and a swaging die 6 and a spinning die 7 equipped with each of the stations. The swaging die 6 and the spinning die 7 are utilized in third and fourth steps of the gear manufacturing method, as described hereinafter. In a case where many stations are arranged, the swaging dies 6 and the spinning dies 7 may be divided into plural numbers of dies, with varied formation degrees provided for the respective stations. Moreover, the combination of a plurality of dies will make it possible to form the material in various shapes as occasion demands.

The dies of the respective stations are exactly controlled in their positions with respect to the material support member 10 by means of a ball screw and a servo-motor. The positions of the dies, fitted to the supported material 10 for working are detected by sensor means, and the dies are moved under pressure. The formation working, at the respective stations, is performed by rotating the material 1a to be worked with the dies being followed and rotated.

When the coarse toothed gear, formed by means of the coarse working unit 11, has been completed, the last working die of such coarse working unit 11 is retracted and the finish working unit 12 is then moved forward so as to fit a spinning die 9 of the finish working unit 12 to the material 1a thereby performing the finish working for the toothed gear being formed. The advancing motion of the finish working unit 12 is accurately performed, as are the respective stations of the coarse working unit 11, by means of a ball screw and a servo-motor. The high frequency heating unit 13 is constructed to be capable of advancing toward the material support member 10. The high frequency heating unit 13 is moved forward after confirmation of retracting of both the working units 11 and 12 from the material support member 10 and heats an outer peripheral portion of the material 1a to be worked to a predetermined temperature, that is, to a temperature of 400°–500° C., before working, and a quench hardening temperature of, for example, 900° C., after working.

The switching of the heating temperature of the heating unit 13 will be performed, for example, by changing an electric voltage applied, by changing electrodes, by changing the frequency for heating, by changing a distance between a heating coil and a material to be heated, or by changing heating time.

Figure 3:
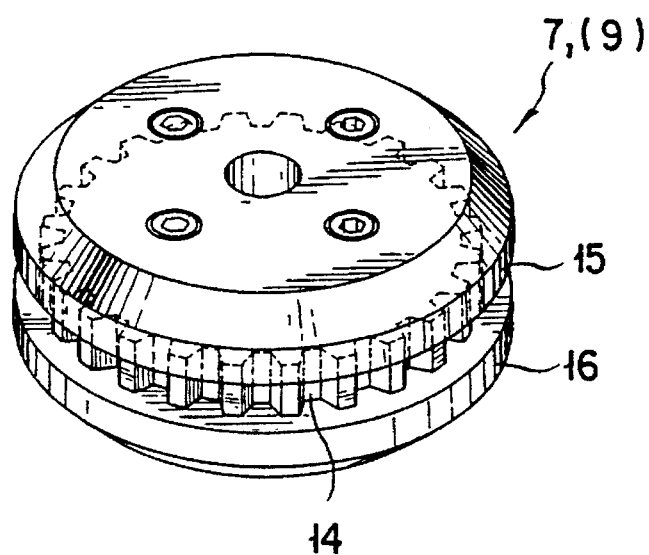
FIG. 3 is a perspective view of a spinning die for forming the toothed gear.
Figure 4:
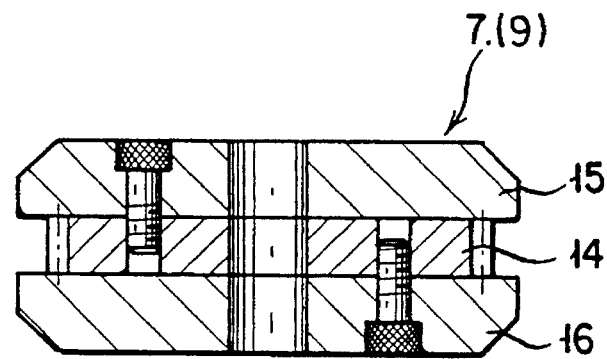
FIG. 4 is a sectional view of the spinning die shown in FIG. 3.

FIGS. 3 and 4 show the spinning die 7 or 9 for coarse or finish gear teeth formation, utilized for the gear manufacturing apparatus of the characters described above, and the spinning die 7 (9) comprises a gear formation member 14 and flange members 15 and 16 clamping the gear formation member 14 therebetween from both axial sides thereof. The flange members 15 and 16 each has an outer diameter larger than that of the gear formation member 14. The structures of the spinning dies 7 and 9 for the coarse formation and the finish formation are substantially identical to each other except for their die shapes.

Figure 5A:
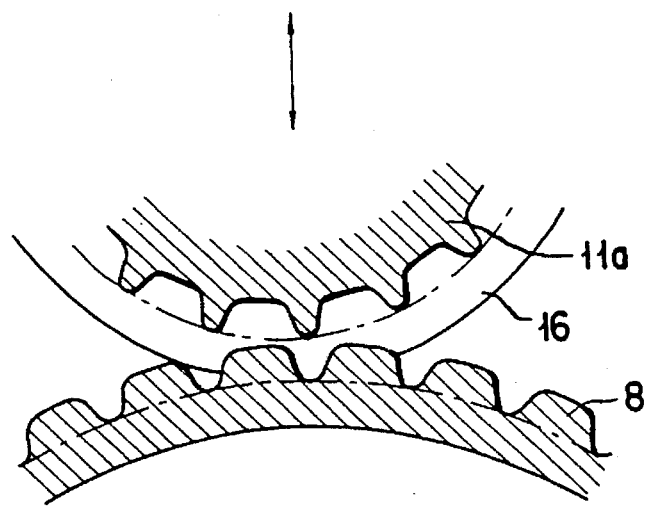
FIGS. 5A and 5B are views showing working processes to the material.
Figure 5B:
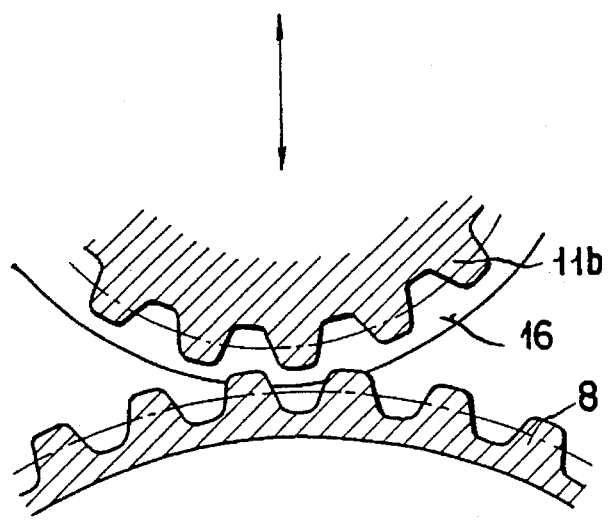

A gear 8, FIGS. 5A and 5B to be spun by the die 7 (9) is formed partially in sealed-forged shape at a recessed portion formed between the gear formation member 14 and the flange members 15 and 16.

FIGS. 5A and 5B show the coarse forming conditions in use of coarse forming, or preforming. Dies 11a and 11b, having formation degrees different from each other, and the respective teeth portions of the gear 8 of the material 1 are successively formed in accurate teeth shapes, by the respective dies.

The gear manufacturing method, in use of the manufacturing apparatus of the characters described above, according to another embodiment of the present invention will be described hereunder with reference to FIGS. 6 to 11.

The gear manufacturing method according to the present invention will be performed by the following first to fifth steps.

Figure 6:
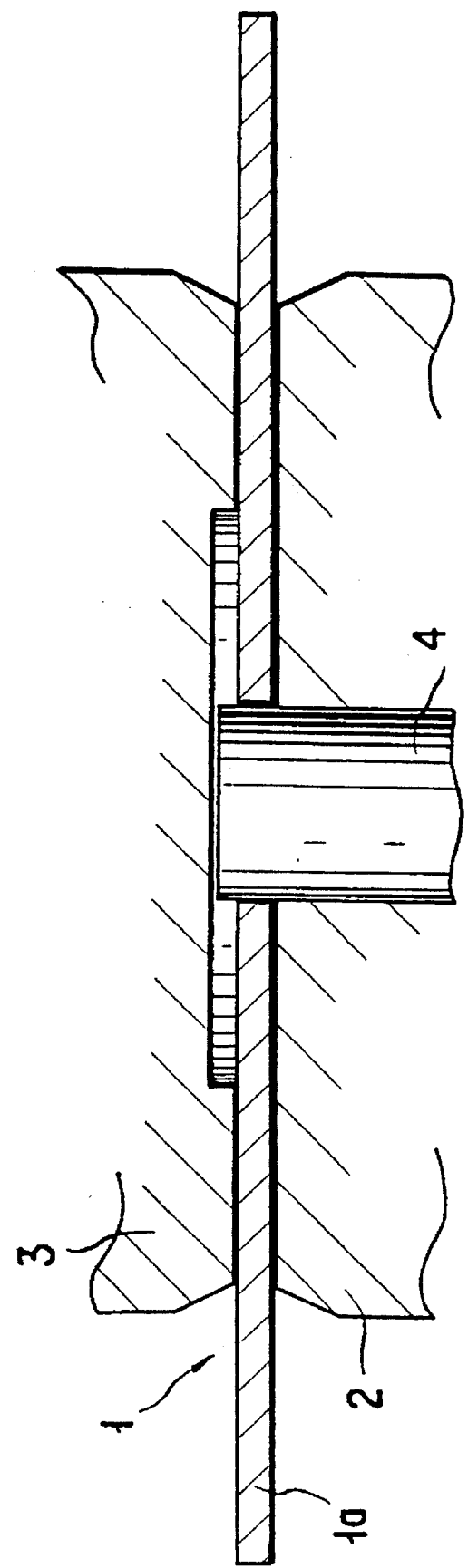
FIG. 6 is a sectional view showing the disc-shaped material fixed for a swaging working.

(1) First Step:

A material 1 is prepared in a manner such that a plate member 1a, having a thickness of about 2–3 mm, is punched out in a disc shape so as to have a central hole, as shown in to FIG. 6. The material 1 is clamped by and between a fixing table 2 and a pressing plate 3 at a central axis side thereof except for an outer peripheral portion of the plate member 1a to be subjected to a swaging working. At this time, a positioning pin 4, provided for a central axis portion of the fixing table 2, is fitted into the central hole of the disc-shaped material 1.

Figure 7:
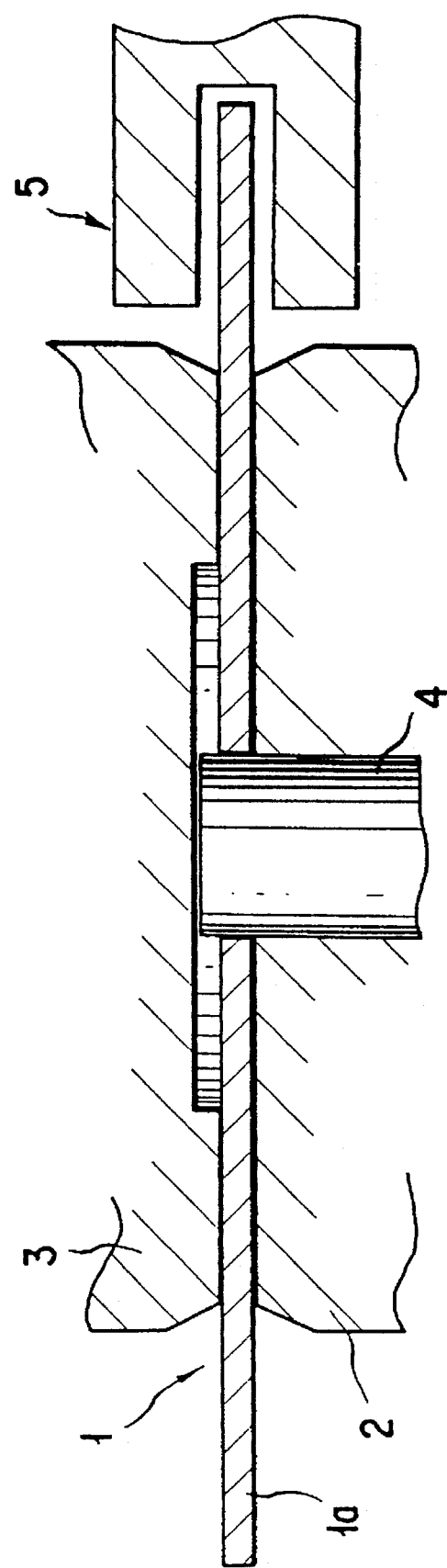
FIG. 7 is a sectional view, similar to that of FIG. 6, in a state for the outer peripheral portion of the material being heated.

(2) Second Step:

Next, in the second step, as shown in FIG. 7, the outer peripheral swage working portion of plate member 1a is heated by, for example, a high frequency heating device 5, to a temperature of about 400°–500° C.

Figure 8:
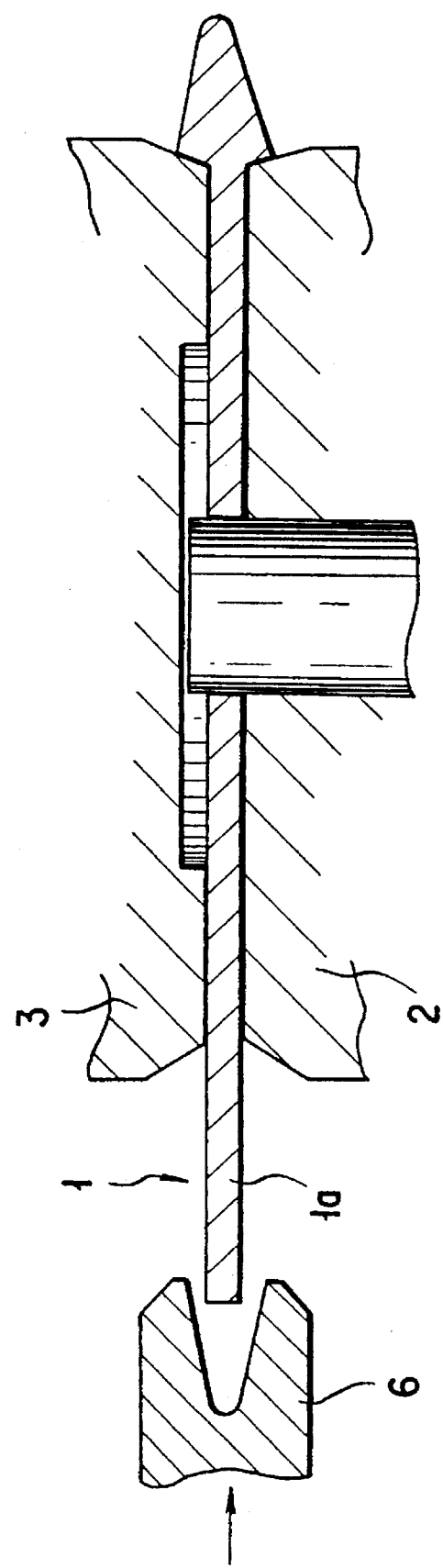
FIG. 8 is a sectional view, similar to that of FIG. 7, in a state for the outer peripheral portion of the material being swaged.

(3) Third Step:

As shown in FIG. 8, the outer peripheral portion of plate member 1a of the disc-shaped material 1 is subjected to swage working in the axial direction of plate member 1a by means of a swaging die 6. Through this swage working, the material 1 is formed, as shown in FIG. 8, at the right hand side of FIG. 8, so that the outer peripheral portion is made relatively thick radially inward and made thin radially outward.

Figure 9:
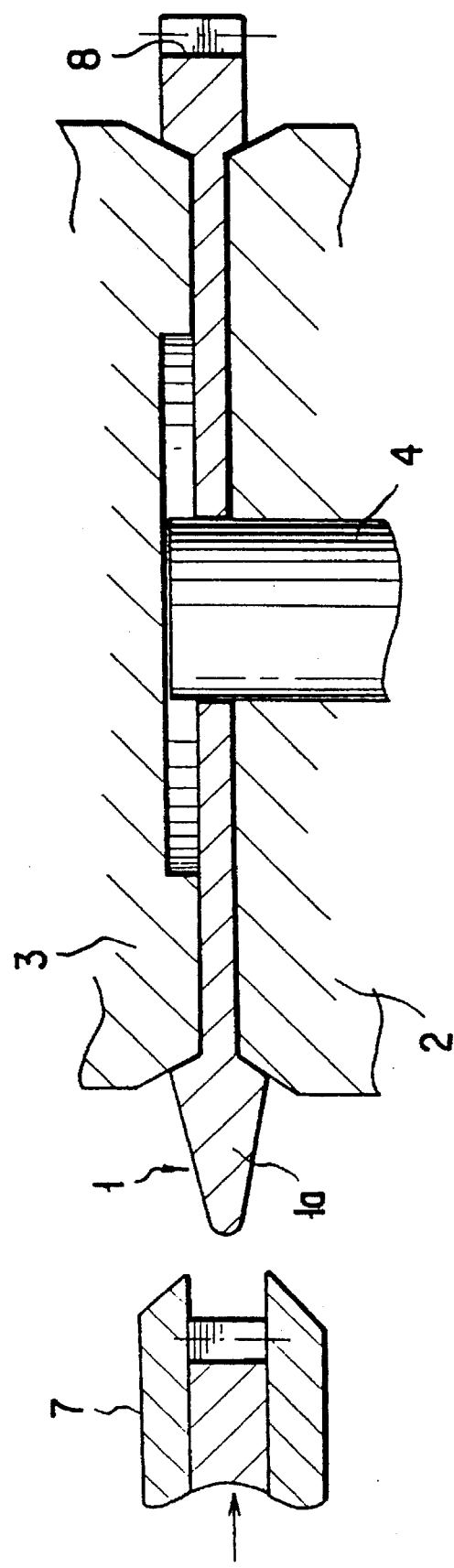
FIG. 9 is a sectional view, similar to that of FIG. 8, in a state for the outer peripheral portion of the material being spun for coarse formation of teeth.

(4) Fourth Step:

Next, as shown in FIG. 9, the thickened swaged portion is subjected to a spinning working by means of a spinning die 7 as shown to coarsely preform gear teeth 8 each having a rectangular cross section.

(5) Fifth Step:

Finally, as shown in FIG. 10, the thus coarsely formed gear teeth 8 are finished by means of a spinning die 9 for finally forming the toothed gear.

During the above toothed gear manufacturing steps, the peripheral portion of plate member 1a to be worked is heated to a temperature of about 400°–500° C. at the second step, and in the third step of the swage working, the temperature of the peripheral portion of plate member 1a is further increased to a temperature higher than 500° C. through friction caused by plastic deformation at the swage working. This temperature, however, does not exceed 700° C. which is a recrystallization temperature. Such temperature condition is also applied to the fourth and fifth steps of the spinning working. Accordingly, in the above toothed gear manufacturing steps, it is preferred that the swage working and the spinning working are performed at a temperature more than 400° C. and less than 700° C.

Thus, the portion to-be worked of the material 1 is fluidized through the above heating process and is then subjected to the plastic working under the fluidized condition. Accordingly, a working pressure required for such plastic working is about half (½) of a working pressure in a cold working. Moreover, because all the working steps are performed at a temperature less than 700° C., no scale or crack is caused to the portion to be worked.

Furthermore, because of work hardening to the worked portion due to the plastic deformation through the swage working and the spinning working, the hardness of the worked portion is made higher than an essential hardness of the material 1. For this reason, a product manufactured by the fifth step will be provided as a final product in practical use, and in such case, because any specific heat treatment is not effected to the product, a soft steel plate, such as, SPC material, may be utilized as the material 1 rather than a high carbon steel plate.

On the other hand, when the product is utilized as a member to which some extent of strength is required, a high carbon steel plate will be utilized as the material 1, and in such case, the following sixth and seventh steps will be required, after the fifth step.

In the sixth step, the plastically formed portion is heated by the heating means, such as, high frequency heating device 5 used in the second step to a quenching temperature for that portion. In the seventh step, a quench hardening process is effected to that portion. These heating and quenching processes are performed under the condition that the material 1 is clamped by and between the fixing table 2 and the pressing plate 3, so that the material 1 can be prevented from deforming due to the heating or quenching.

The reason why the portion to be worked is heated, as in the above second step, before the swage working and the spinning working, to the temperature of about 400°–500° C. is as follows.

Figure 11:
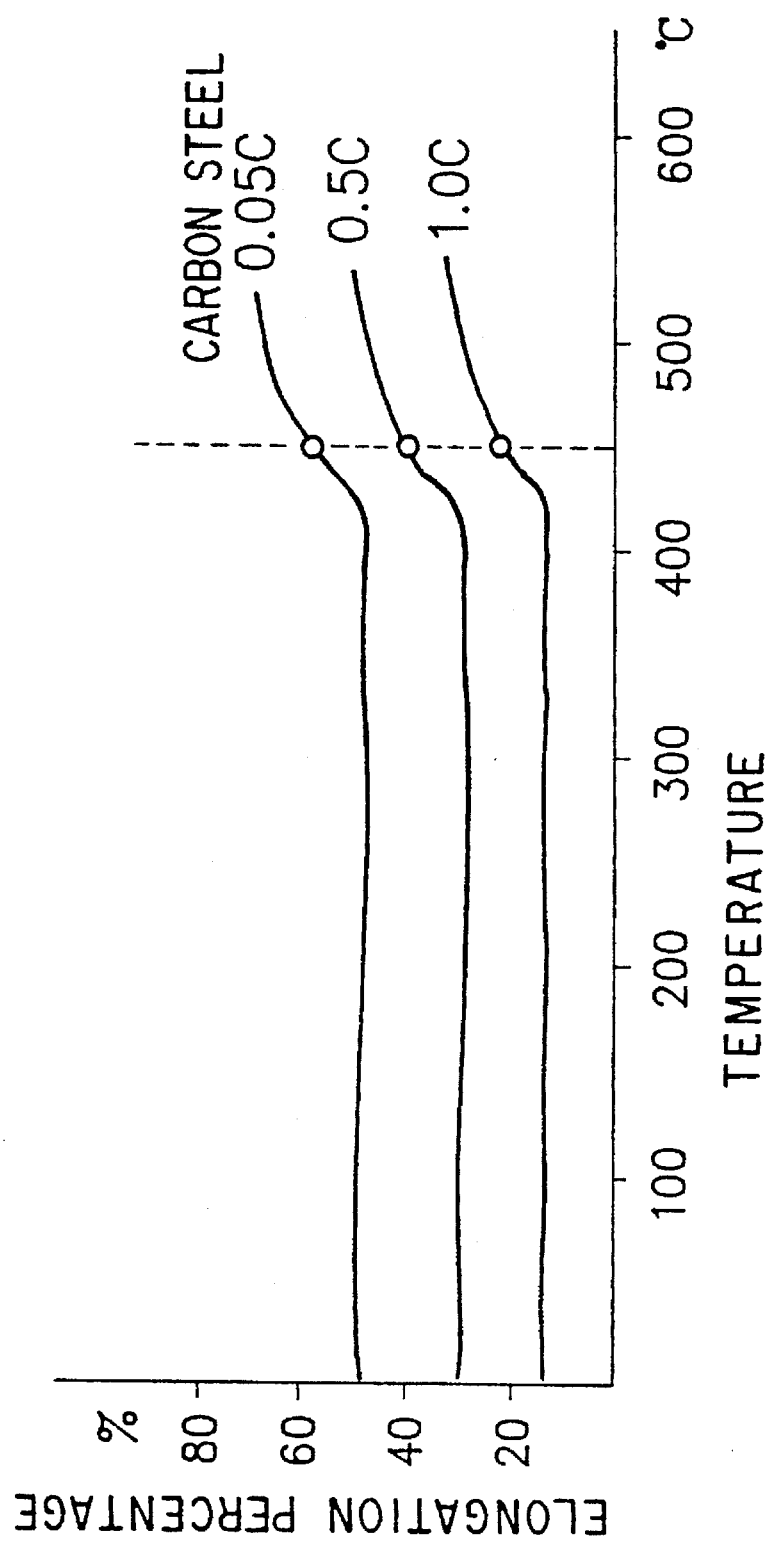
FIG. 11 is a diagram showing variation of elongation percentage of steel material with respect to chance of temperature.

With reference to FIG. 11, elongation percentages of steel materials become rapid at a temperature between 400° C. and 450° C. for the reason that low carbon martensite, produced through the heating process, is decomposed into ferrite and two dimensional cementite, then carbide vanishes, and the two dimensional cementite precipitates, thereby the cementite is softened.

On the other hand, the preferable upper limit temperature of 500° C. is decided for the reason that when the portion to be worked is heated to a temperature more than 500° C. at the heating process, the temperature of the portion to be subjected to the plastic working may exceed 700° C., due to the friction through the plastic deformation during the swage working, and hence, a scale may be caused to the worked portion. As described hereinbefore, according to the present invention, any scale or crack of the material being worked can be prevented during the swage working and the spinning working of the outer peripheral portion of the disc-shaped material.

Because the swaging pressure and the spinning pressure in the present invention is less than that in the cold working by about half time, the devices used for the respective workings can be made compact and the devices and the dies are elongated in their usable life. The working processes can be reduced to shorten the working time, thus improving productivity.

Still furthermore, because the working since temperature does not exceeds 700° C. as a crystallization temperature, any scale can be prevented during the working processes.

What is claimed is:

1. A method of manufacturing a toothed gear comprising the steps of:

preparing a disc-shaped material to be worked;

fixing the disc-shaped material to a material support member;

heating an outer peripheral portion of the disc-shaped material on said material support member to a temperature of 400°–500° C.;

swaging the outer peripheral portion of the heated disc-shaped material on said material support member to form a thickened portion; and spinning the thickened portion of said heated disc-shaped material on said rotatable support member against at least one spinning die to plastically form a toothed gear on the outer peripheral portion of the disc-shaped material.

2. A method of manufacturing a toothed gear according to claim 1, wherein said spinning step includes a first step for forming a coarse toothed gear and a second step for forming a finished toothed gear.

3. A method of manufacturing a toothed gear according to claim 1, wherein the disc-shaped material is formed by punching out from a high carbon steel plate.

4. A method of manufacturing a toothed gear according to claim 1, wherein the disc-shaped material is formed by punching out from a soft steel plate.

5. A method of manufacturing a toothed gear comprising the steps of:

preparing a disc-shaped material to be worked;

fixing the disc-shaped material to a material supporting member;

heating an outer peripheral portion of the disc-shaped material on said material support member to a temperature of 400°–500° C.;

swaging the outer peripheral portion of the disc-shaped material on said material support member and forming a thickened portion;

spinning the thickened portion of said heated disc-shaped material on said material support member against at least one spinning date to plastically form a toothed gear on the outer peripheral portion of the disc-shaped material; and heating the toothed gear to a temperature of about 900° C. for quenching and then quenching the toothed gear.

6. A method of manufacturing a toothed gear according to claim 5, wherein said spinning step includes a first step for forming a coarse toothed gear and a second step for forming a finished toothed gear.

7. A method of manufacturing a toothed gear according to claim 5, wherein the disc-shaped material is formed by punching out from a high carbon steel plate.

* * * * *